United States Patent [19]

Soltesz et al.

[11] Patent Number: 5,756,978
[45] Date of Patent: May 26, 1998

[54] MODULAR OPTICAL MEMORY CARD IMAGE DISPLAY POINT OF SALE TERMINAL

[76] Inventors: John A. Soltesz; Renee Keller, both of 7140 Brookwood Dr., Brookfield, Ohio 44403

[21] Appl. No.: 640,675

[22] Filed: May 1, 1996

Related U.S. Application Data

[63] Continuation of Ser. No. 267,031, Jun. 21, 1994, abandoned.

[51] Int. Cl.⁶ .................................................. G06K 5/00
[52] U.S. Cl. .................................................. 235/380; 902/22
[58] Field of Search .................................. 235/380, 379, 235/454, 449, 382, 382.5, 381, 440; 380/23, 54; 902/4, 6, 22

[56] References Cited

U.S. PATENT DOCUMENTS

| | | | |
|---|---|---|---|
| 4,901,241 | 2/1990 | Schneck | 364/464.02 |
| 4,912,309 | 3/1990 | Danielson | 235/380 |
| 5,010,238 | 4/1991 | Kadona | 235/379 |
| 5,027,401 | 6/1991 | Soltesz | 380/54 |
| 5,113,183 | 5/1992 | Mizuno | 340/825.31 |
| 5,151,582 | 9/1992 | Fujioka | 235/469 |
| 5,196,682 | 3/1993 | Englehardt | 235/454 |
| 5,214,699 | 5/1993 | Monroe et al. | 380/23 |
| 5,245,166 | 9/1993 | Shepard | 235/456 |
| 5,270,526 | 12/1993 | Yoshihara | 235/487 |
| 5,291,006 | 3/1994 | Nishiguma | 235/454 |
| 5,321,751 | 6/1994 | Ray et al. | 380/23 |
| 5,336,871 | 8/1994 | Colgate, Jr. | 235/380 |

*Primary Examiner*—Donald T. Hajec
*Assistant Examiner*—Karl Frech
*Attorney, Agent, or Firm*—Bacon & Thomas

[57] ABSTRACT

A modular point-of-sale image display terminal combines magnetic stripe and optical card technology to ensure compatibility with existing networking systems while permitting images stored on the optical card to be decoded and displayed in order to provide additional security for sales and other transactions or services which require authentication of the card and/or verification of the identity of the cardholder. The design of the terminal is modular, permitting flexibility for different applications and simple upgradeability. In addition, the terminal is provided with modem communications while also being capable of functioning as a stand-alone terminal.

13 Claims, 3 Drawing Sheets

5,756,978

MODULAR OPTICAL MEMORY CARD IMAGE DISPLAY POINT OF SALE TERMINAL

This application is a Continuation of application Ser. No. 08/267,031, filed Jun. 21, 1994, abandoned.

BACKGROUND OF THE INVENTION

1. Field of the Invention

This invention relates to apparatus for enabling an optical card reader to be used for on-site identity verification and transaction processing. The invention also relates to a point-of-sale terminal with identity verification capabilities, and in particular to a point-of-sale terminal having an optical card reader and a display screen capable of displaying an image of the authorized card user for identity verification purposes.

2. Description of Related Art

Optical cards are a commercially available durable data storage medium with a current capacity of several megabytes of information in an area smaller than the size of a conventional credit card. While superior to existing optical and magnetic information storage media, however, efforts to market optical card readers as computer peripheral devices have to date been largely unsuccessful because computer users are unwilling to replace the hardware and software infrastructure currently in place for optical disc and magnetic media. The technology used to encode an optical card is essentially the same as that used to encode an optical disc, except that the medium is stationary during the encoding process.

An ideal use for optical cards was recently proposed in U.S. Pat. No. 5,027,401 (Soltesz), which discloses a method for enabling use of optical cards as identity cards by storing images of authorized users of the optical cards for display during processing of transactions, thereby ensuring that holders of the cards are authorized to use them.

It was pointed out in the Soltesz patent that billions of dollars are lost every year due to the unauthorized access to data and accounts permitted by conventional credit card processing. To solve this problem, Soltesz proposed a method of encrypting an image, storing it on a card, and later retrieving and decrypting the image in a completely secure manner without the complexity associated with prior public and private key encryption systems.

Subsequent research associated with commercialization of the system described in the Soltesz patent led to the conclusion, however, that conventional hardware capable of retrieving an image stored using the visual image encryption and storage algorithm described in the Soltesz patent, while adequate for demonstration purposes, does not meet the practical needs of merchants, government agencies, and others who might benefit from the patented image encrypting system.

These practical needs are related to cost and ease-of-use. Implementation of the Soltesz image storage system in retail transactions using conventional equipment, for example, would require, in addition to a separate image display apparatus at each point-of-sale, a cash register, card authorization terminal, and receipt printing equipment. Such point-of-sale applications are in general extremely sensitive to cost, and without some type of integration of functions in a single apparatus, the costs are simply too high for individual retailers.

On the other hand, a point-of-sale transaction processing terminal which integrates all possible functions for one application will have unneeded functions for another application, also raising costs and increasing the complexity of the apparatus. For example, a communications link with a central computer, while essential for credit transactions, is unnecessary where the card is merely used for identification purposes, and a printed record of a transaction may not be necessary where the card is used to gain access to a facility rather to purchase a product or service.

Furthermore, in addition to the problem of integrating functions to reduce costs for individual retailers without redundancy and unnecessary complexity, the manufacturer of a point-of-sale terminal capable of implementing the method described in the Soltesz patent is also faced with the need to standardize the apparatus as much as possible in order to maintain mass production capabilities and an economical service or customer support network, while still meeting the individual needs of different users (including the need to providing compatibility with existing magnetic stripe based transaction card processing systems during transition to more secure optical card processing systems).

The above-mentioned research into commercialization of the system described in the Soltesz patent has therefore focused on the development of a mass-producible terminal capable of implementing the method described in U.S. Pat. No. 5,027,401 in a wide variety of applications, at a minimum cost and with maximum flexibility. The terminal which has resulted from these research efforts implements a number of innovations, described below, and greatly increases the range of potential applications for the patented system beyond those envisioned in the original patent. These applications include, but are not limited to, point-of-sale identity verification for credit and debit card transactions, identity verification in automated teller machine applications using image recognition software, on-site social security, welfare, and private and public health services user identification, mobile applications such as use in a police vehicle for drivers license verification during traffic stops, and use as an access card or badge in order to gain entrance to secured facilities, with or without image recognition software. In addition, the terminal is capable of use with existing transaction cards having only a magnetic stripe, thus allowing gradual introduction of the optical identity cards in an economically practical manner.

SUMMARY OF THE INVENTION

It is accordingly an objective of the invention to provide an integrated card reader/transaction processing terminal designed to eliminate counterfeiting, fraud and abuse in most transaction and/or identity card based applications and to secure positive identification of a card holder in a practical, versatile, and yet completely secure manner.

It is more particularly an objective of the invention to provide an integrated optical card reader/transaction processing device having a modular design capable of being easily adapted for a wide variety of applications, including those which require remote communications as well as stand-alone use, and which is especially suited for use as a point-of-sale terminal with identity verification and credit or debit processing capabilities, including receipt printing.

It is yet another objective of the invention to provide an optical card reader/transaction processing terminal capable of also reading existing magnetic stripe based cards.

These objectives are achieved by providing a point-of-sale terminal having high speed computational and communication abilities, and which includes a built-in display for viewing card information/authorization as well as providing means for showing an image of the person that is authorized to use the card.

To maintain the highest flexibility, the preferred terminal utilizes a modular architecture in which individual hardware option cards can be installed into the preferred terminal to offer the users only the functions they need at the lowest possible cost. For example, the modular design will allow, in addition to or in place of a magnetic stripe reader, the inclusion of a smart card or flash ROM card reader, as well as standardized communications ports such as, by way of example, a serial RS-232 port, capable of data transfer with virtually any type of computer system, and/or additional means of communication such as an on-board modem, cellular link, or even a satellite transceiver feed or port.

In retail point-of-sale applications, the preferred terminal allows a retailer to recall an image of the card's authorized user to verify that the authorized user is actually the person using the card, while the ability to read magnetic cards as well as optical cards, in conjunction with an on-board modem, allows the point-of-sale terminal to be used as a credit card authorization terminal, and the inclusion of an on-board printer allows printing of a receipt or hard copy of the transaction, thus providing unprecedented flexibility and ease-of-use.

An important advantage of the preferred point-of-sale terminal is that it is a stand-alone identification system that uses the latest in identification technology. The credit card sized optical card utilizes compact optical disc (CD) type, state-of-the-art technology to achieve the highest data storage capability of any known technology. The card can be used to hold literally a thousand pages of text and/or graphical images for identification in a variety of applications.

BRIEF DESCRIPTION OF THE DRAWINGS

FIG. 4 is a rear view of a portion of the point-of-sale terminal of FIG. 1.

DETAILED DESCRIPTION OF THE PREFERRED EMBODIMENTS

Figure 1:
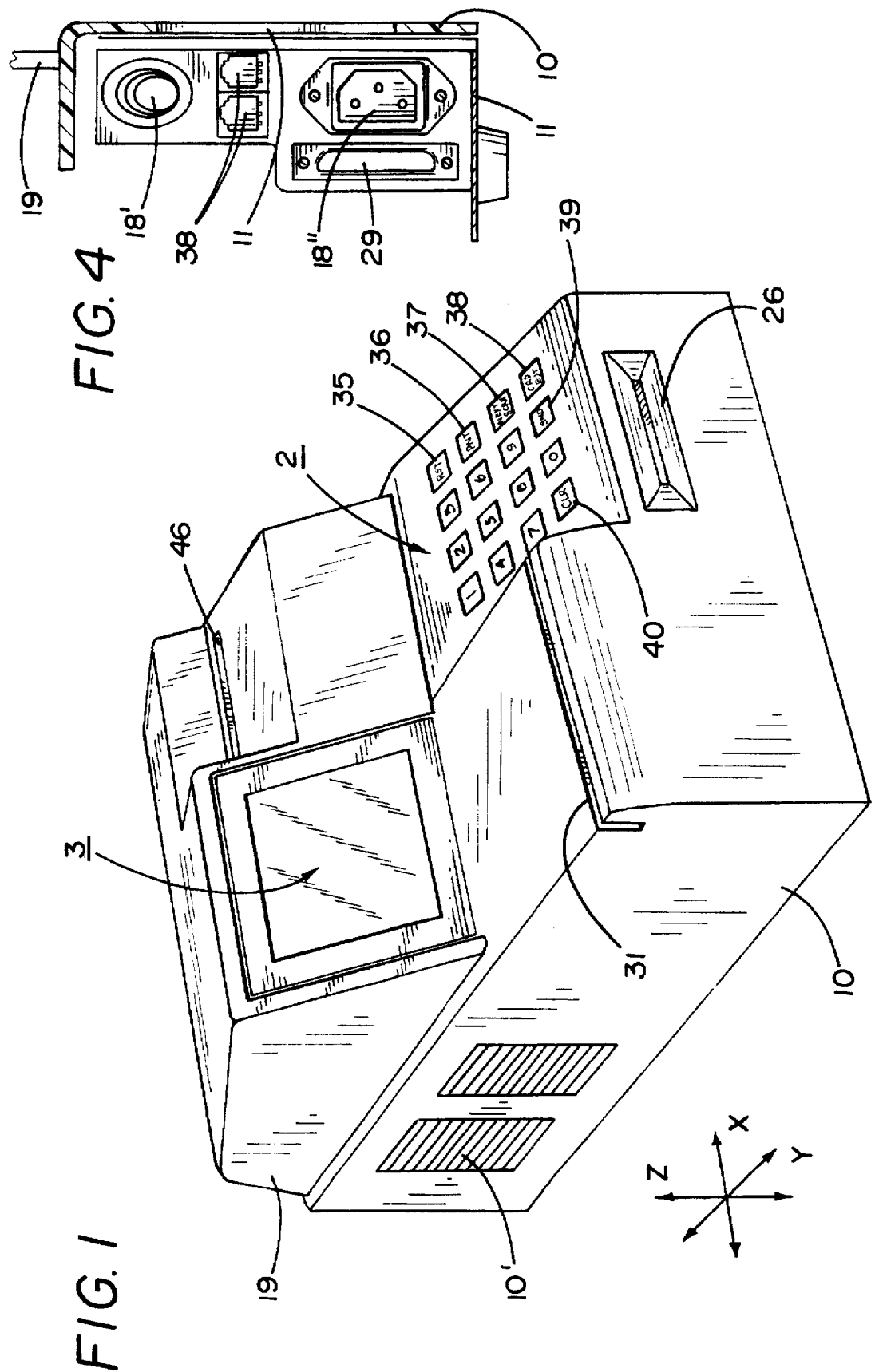
FIG. 1 is a perspective view of a point-of-sale terminal constructed in accordance with the principles of a preferred embodiment of the invention.

FIGS. 1-4 illustrate a preferred apparatus for on-site identity verification and transaction processing. However, while the preferred apparatus is specifically illustrated as being configured for use as a point-of-sale terminal for use in retail credit and debit card transactions, it will be appreciated by those skilled in the art, particularly in view of the objective of providing increased flexibility, that the preferred apparatus is not to be limited to retail credit and debit card transactions, but rather is capable of being used in a wide variety of applications.

The apparatus of the preferred embodiment includes an optical card reader 1, a keypad 2, a display 3, and a printer 4. These components are controlled by appropriate control circuitry, which may be varied by those skilled in the art depending on the requirements of the specific components to be controlled. For example, the illustrated unit is advantageously provided with a 32-bit microprocessor (not shown), such as an Intel 80486™ processor or compatible and a math coprocessor for processing the encryption algorithm described in U.S. Pat. No. 5,027,401, although a Pentium™ or RISC-based processor could easily be substituted, as well as control circuitry based on architectures other than the 32-bit architecture used in an 80486™, including parallel processing configurations, neural network-based architectures, and numerous other device control and image processing technologies. Also included in the control circuitry, are a random access memory (RAM), currently a 1 MB dynamic random access memory (DRAM), a power supply, and display driver circuitry.

The preferred apparatus is housed within a case 10 made, for example of an ABS plastic resin material which fits over a metal chassis 11 divided by bulkheads 12 into a compartment 14 (shown in FIG. 2), a compartment 15 (shown in FIG. 3), and a compartment 16 (shown in FIGS. 2 and 3) for housing, respectively, the card reader 1, circuit boards 17 as described below, and a 110 VAC power supply 18 controlled by a switch 18' and connected to a source of AC power via a socket 18". An upper section 19 of case 10 supports the video display 3 and the printer 4 together with paper for the printer. In the illustrated embodiment, the lower part of case 10 also includes louvers 10' adjacent compartment 16 to provide ventilation for power supply 18, although those skilled in the art will appreciate that such details as cooling and ventilation are a function of the type of power supply and other circuitry and therefore form no part of the present invention.

Overall dimensions of the case 10 in the currently preferred embodiment are approximately 10.5"×16.5"×9" (taken along the x, y, and z axes shown in FIG. 1) although it is anticipated that further commercial development will result in reduced case dimensions, particularly as smaller card readers become available, and it is to be understood that the invention is not to be limited to any particular set of dimensions.

Figure 3:
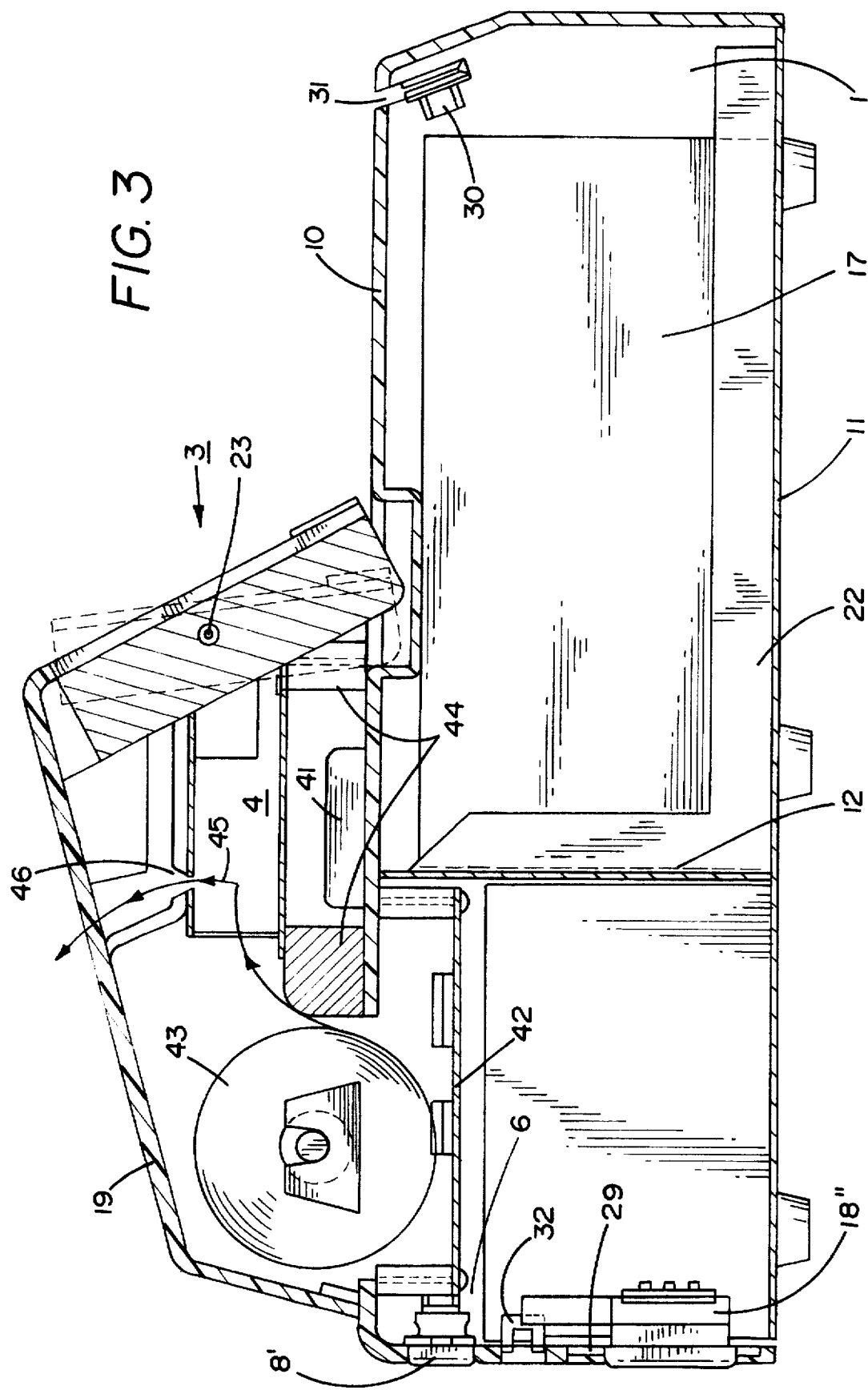
FIG. 3 is a second cross-sectional side view of the point-of-sale terminal of FIG. 1.

Maximum flexibility is obtained by using a modular design in which the various controller circuits are provided on separate daughterboards (represented in FIG. 3 by the single circuit board 17 which is supported by brackets 22 which form a plurality of expansion slots into which additional daughterboards can be inserted in order to upgrade or expand the basic system, the daughterboards all being connected to a single passive backplane board (not shown) which provides connections to the power supply 18.

The first daughterboard is a processor board which includes the above-mentioned microprocessor and, if required, a math co-processor such as the Intel 80487 processor. A video memory in the form of a VLSI chipset having a 1 Meg DRAM and 1-2 MB of Flash Memory to hold the operating program could also be included on the main daughterboard.

The second daughterboard is a modem board of conventional type which may be used for credit card authorization. Also included are an LCD interface board, capable of handling, in the illustrated embodiment, a 320×240 Black and White LCD display, a serial interface for the communicating with other computer systems, a magnetic card reader and keyboard interface and, preferably, a SCSI interface to the optical card reader.

Display 3 is, in the preferred embodiment, a roughly 4.7" diagonal LCD screen with backlighting and which is capable of displaying black-and-white images of an authorized user of the card as well as instructions and other pertinent information when the card is inserted or passed through the card reader. Those skilled in the art will appreciate that, as with the other components described herein, the display 3 is described by way of example only, and that display technologies other than LCD technology may be used, including the use of an ordinary CRT for the display.

As is best shown in FIG. 3, the display 3 is preferably mounted as a discrete unit for pivoting around a pivot 23 on the upper section 19 of case 10 between the illustrated position and a position shown in dashed lines, in order to provide an optimal viewing position for different viewers. By mounting the display as a discrete unit, the display can easily be replaced as improved displays become available or to meet customer demands for a color display or improved resolution.

Figure 2:
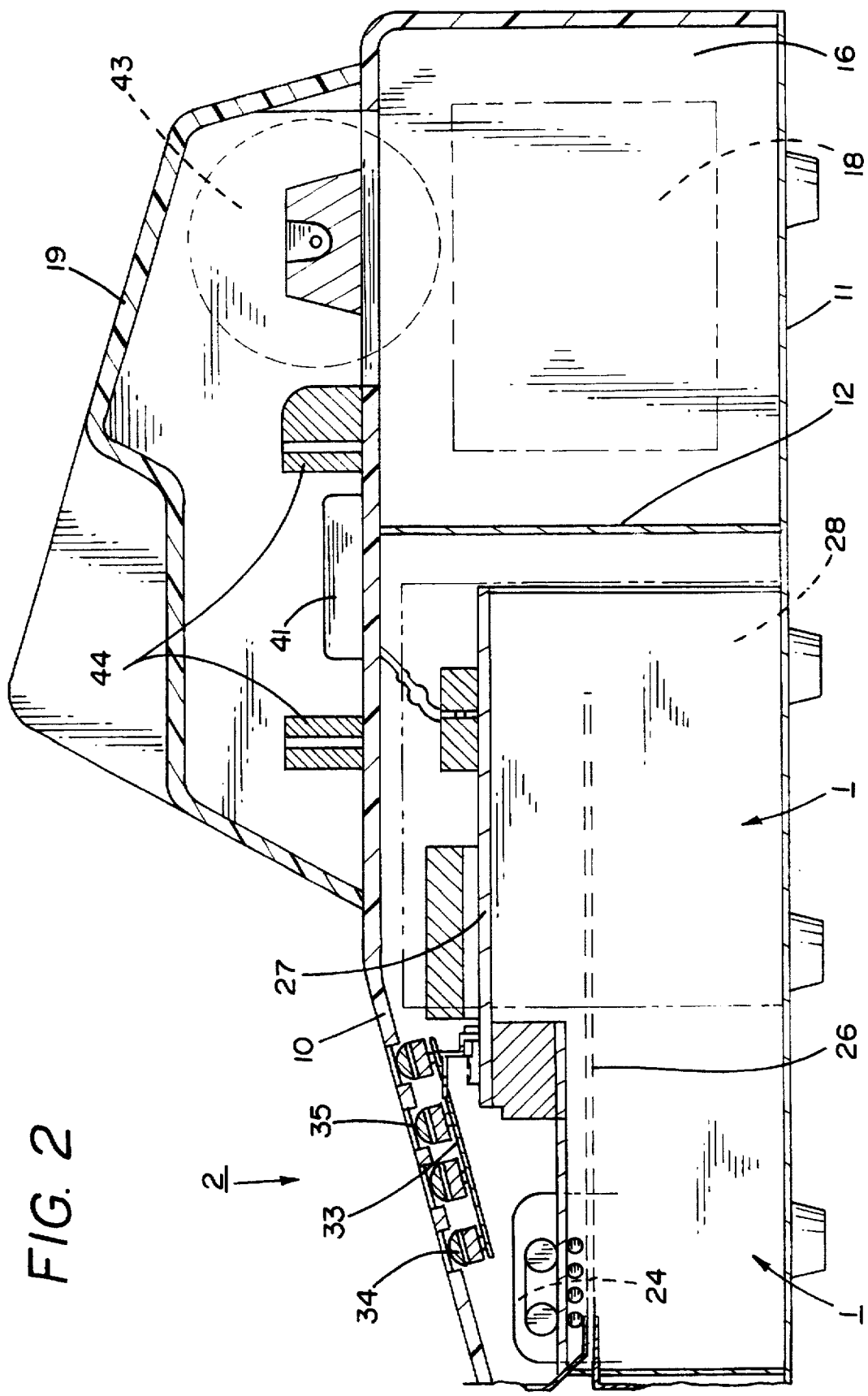
FIG. 2 is a first cross-sectional side view of the point-of-sale terminal of FIG. 1.

At the heart of the preferred apparatus is the optical card reader 1, which is outlined in the drawings. While the invention can be used with any available optical card reader capable of reading standard format optical cards, the currently preferred is a Conlux P/N LC-305 optical card reader, which has a small enough footprint to fit within compartment 14, as shown in FIG. 2, including a drive mechanism 24 for positioning a card inserted through slot 26 into the main reader mechanism 27. An internal circuit card 28 is mounted at the side of compartment 14 and includes control electronics (not shown) provided with the reader. Included on each optical card read by card reader 1 is an image of the customer, as well as customer specific data including the customer's name, address, social security number, and so forth as required by the application and, optionally, a digitally captured signature. The microprocessor interfaces with the optical card reader via a SCSI or RS232C interface, while the preferred terminal may also include one or more external SCSI, RS232, or other standard interface ports 29 available for future expansion or to permit inter-terminal communications or communications with a central computer or network server.

Preferably, since most customers will initially have old fashioned magnetic stripe-type credit cards and since the image-encoded optical cards envisioned by the present invention will need to include magnetic stripes in order to accommodate existing point-of-sale terminals, a swipe-type magnetic card reader 30, accessed through slot 31, is included in the unit, and an internal modem is provided internally to enable the terminal to verify credit cards over a telephone line plugged into one of phone jacks 32. In applications where the terminal will not have access to a telephone line, a cellular or satellite link can easily be provided to communicate with a central location, for example to access a database of stolen vehicles or to check a criminal record or immigration status.

Because of the preferred system's modularity, those skilled in the art will appreciate that additional components, such as a chip card reader, or a smartcard or flash ROM cartridge storage device may be included in addition to or in place of the magnetic stripe reader, although the use of a magnetic stripe reader in combination with the optical card reader is especially advantageous for the retail point-of-sale applications for which the illustrated terminal will be used.

The keypad 2 for data input allows entry of data for processing by the internal microprocessor unit, and is mounted on a bracket and circuit board 33 extending from the card reader. As is conventional, the keypad includes a plurality of spring-biased keys 34, supported by circuit board 33, which extend into openings in the case 10 secured by a thin Lexan™ sheet. In addition, a conventional external keypad may be included to permit customers to enter a personal identification number (PIN) for added security.

The main keypad 2 includes, as illustrated in FIG. 1, ten numerical keys marked "1"–"9" and "0," as well as a "RESET" key 35 for resetting the microprocessor, a "PRINT" key 36 for printing a receipt of a transaction using printer 4 (described below), a "NEXT SCREEN" key 37 for paging through a displayed image, a "CARD EJECT" key 38 for ejecting an optical card from card reader 1 via slot 26, a "SEND" key 39 for sending a request for credit card authorization via the modem jack 32, and a "CLEAR" key 40 for clearing the display 3. It will of course be appreciated by those skilled in the art that, as with other aspects of the illustrated embodiment, the arrangement of the keys, including the number of keys and their designated functions, may be varied to suit the application in which the terminal is to be used.

The illustrated printer 4 is an Epson™ dot matrix printer capable of two-ply printing for customer receipts, with a paper width of roughly three inches for a terminal having the illustrated dimensions. Printer 4 is mounted in the upper section 19 of housing 10, which preferably includes a ribbon cable access hole 41 for connecting the printer's internal circuitry to an external circuit board 42, a mounting fixture for paper roll 43, as well as appropriate mounting fixtures 44 for the printer itself, with the paper path 45 extending through a slot 46 provided at the top of case 10. Of course, instead of a dot matrix printer, a laser, inkjet, or other type of printer may be substituted as desired.

Because of the modular architecture of the preferred terminal, it can easily be adapted to accommodate such features as a fingerprint reader or other biometric (hand geometry, pupil scanning, and the like) equipment that attaches to the serial port, or a microphone and sound card to enable voice recognition. Another potential addition to the preferred apparatus is image recognition software capable of automatically comparing the stored image with an image of the card holder captured during the transaction, for example by a video camera located at an automatic teller machine (ATM), or a security camera located at an unattended entrance to a secured facility accessed by the card. These and other variations and modifications of the invention which will inevitably occur to those skilled in the art are all intended to be included within the scope of the invention insofar as they are permitted by the prior art.

Having thus described preferred embodiments of the invention and variations and modifications thereof in sufficient detail to enable those skilled in the art to make and use the invention based on the above description and accompanying drawings, it will be appreciated by those skilled in the art that the invention is not to be limited in any way by the above description or illustrations of the preferred embodiment of the invention, but rather that the invention should be defined solely by the appended claims.

We claim:

1. A modular integrated optical card reader/transaction processing terminal useable as a stand-alone terminal for on-site identity verification and transaction processing, comprising:

a housing;

means including an optical memory card reader in the housing for enabling on-site identity verification without the need for remote communications by retrieving an image stored on an optical memory card together with information necessary to retrieve and display the image;

display means in said housing for displaying said image and other instructions and data processed by a microprocessor in said housing; and means including a microprocessor in the housing for controlling said optical memory card reader and additional transaction, and for processing said information retrieved from said optical memory card so that it can be displayed, thereby eliminating the need for using said remote communications to perform said on-site verification.

2. A terminal as claimed in claim 1, wherein said transaction processing means further comprises a printer.

3. A terminal as claimed in claim 1, wherein said interface board includes a modem.

4. A terminal as claimed in claim 1, further comprising a magnetic stripe reader mounted in the housing.

5. A terminal as claimed in claim 1, wherein said terminal is a point-of-sale terminal.

6. Apparatus as claimed in claim 1, further comprising means including communications port for enabling said additional transaction devices to carry-out remote communications while still enabling said image to be displayed without the need for said remote communications.

7. Apparatus for enabling a card reader to be used for on-site transaction processing and identity verification, comprising:

a chassis divided into a compartment for housing an optical memory card reader, a compartment for housing a power supply, and a compartment for housing a plurality of removable circuit boards, including a main circuit board on which is mounted a microprocessor;

means including an optical memory card reader in the housing for enabling on-site identity verification without the need for remote communications by retrieving an image stored on an optical memory card together with information necessary to decrypt and display the image;

a case which fits over the chassis and which forms an upper compartment for housing a printer and to which is mounted an image display device for displaying said image; and a keypad which includes a plurality of keys accessible through said case for entering data and commands to be processed by said microprocessor, wherein said case includes a slot through which a magnetic strip reader may be accessed, a further slot through which a printed receipt is retrieved from said printer, and a plurality of openings for data communications ports, said magnetic strip reader being connected through said data communications ports to a communications network to enable data on said strip to be remotely verified, said microprocessor carrying-out all processing operations necessary for display of said image stored on the optical memory card so that on-site verification can be carried out even when said terminal is not connected to a communications network.

8. Apparatus as claimed in claim 7, wherein said display is an LCD display pivotally mounted as a discrete unit on said case.

9. A modular integrated optical card reader/transaction processing terminal useable as a stand-alone terminal for on-site identity verification and transaction processing, comprising:

a housing;

an optical memory card reader in the housing including means for retrieving and decrypting an encrypted image stored on an optical memory card, said image when displayed enabling verification of the identity of the card holder by a viewer of the displayed image without the need for remote communications;

means for removably mounting additional transaction processing devices in said housing as necessary;

display means in said housing for displaying said decrypted image and other instructions and data processed by a microprocessor in said housing, said microprocessor including means for controlling said optical memory card reader and decrypting said image entirely based on information and instructions stored in said optical memory card or components contained within said housing so that said identity verification can be performed without said remote communications;

a keypad in said housing which forms means for entering data and commands to be processed by said microprocessor.

10. A terminal as claimed in claim 9, further comprising means for mounting a printer in said housing.

11. A terminal as claimed in claim 9, further comprising an interface board and a plurality of input/output connectors.

12. A terminal as claimed in claim 9, further comprising a magnetic strip reader mounted in the housing.

13. A terminal as claimed in claim 9, wherein said display is an LCD display pivotally mounted as a discrete unit on said housing.

* * * * *

UNITED STATES PATENT AND TRADEMARK OFFICE
CERTIFICATE OF CORRECTION

PATENT NO. : 5,756,978
DATED : May 26, 1998
INVENTOR(S) : John A. SOLTESZ, et al.

It is certified that error appears in the above-identified patent and that said Letters Patent is hereby corrected as shown below:

In column 7, lines 2-3, delete "and additional transaction".

Signed and Sealed this

Fourth Day of May, 1999

Attest:

Q. TODD DICKINSON

*Attesting Officer*   *Acting Commissioner of Patents and Trademarks*